(12) United States Patent
Laville et al.

(10) Patent No.: US 8,664,945 B2
(45) Date of Patent: Mar. 4, 2014

(54) MAGNETIC ANGLE SENSOR

(75) Inventors: Arnaud Laville, Neuchatel (CH);
Mathieu Poézart, Saint-Aubi (CH)

(73) Assignee: Melexis Technologies NV, Tessenderlo (BE)

( * ) Notice: Subject to any disclaimer, the term of this patent is extended or adjusted under 35 U.S.C. 154(b) by 210 days.

(21) Appl. No.: 13/172,059

(22) Filed: Jun. 29, 2011

(65) Prior Publication Data
US 2012/0001620 A1     Jan. 5, 2012

(30) Foreign Application Priority Data
Jul. 5, 2010   (CH) ........................................ 1108/10

(51) Int. Cl.
G01B 7/14       (2006.01)

(52) U.S. Cl.
USPC ............... 324/207.2; 324/207.21; 324/207.25

(58) Field of Classification Search
USPC ............................. 324/207.2, 207.21, 207.25
See application file for complete search history.

(56) References Cited

U.S. PATENT DOCUMENTS

| | | | |
|---|---|---|---|
| 5,880,586 A | 3/1999 | Dukart et al. | |
| 6,545,462 B2* | 4/2003 | Schott et al. | 324/207.2 |
| 2005/0127899 A1* | 6/2005 | Kakuta et al. | 324/207.2 |
| 2006/0164080 A1* | 7/2006 | Popovic et al. | 324/244 |
| 2007/0080676 A1* | 4/2007 | Racz et al. | 324/117 H |
| 2008/0174308 A1* | 7/2008 | Coillot et al. | 324/252 |
| 2009/0271142 A1* | 10/2009 | Yamashita et al. | 702/141 |
| 2010/0117638 A1* | 5/2010 | Yamashita et al. | 324/233 |

* cited by examiner

*Primary Examiner* — Jermele M Hollington
*Assistant Examiner* — Temilade S Rhodes-Vivour
(74) *Attorney, Agent, or Firm* — McCormick, Paulding & Huber LLP

(57) ABSTRACT

A magnetic angle sensor comprises a semiconductor chip, at least two magnetic field concentrators of planar shape which are arranged on a surface of the semiconductor chip, and four Hall sensors. Each Hall sensor is assigned to one of the magnetic field concentrators and comprises a Hall element or a cluster of Hall elements. The Hall elements are integrated in the semiconductor chip and are arranged in the region of the edge of the assigned magnetic field concentrator where they are permeated by field lines of the magnetic field which extend approximately perpendicularly to the mentioned surface of the semiconductor chip in the region of the edge of the magnetic field concentrator. Two Hall sensors form a first pair of sensors for measuring a first component of the magnetic field and the two other Hall sensors form a second pair of sensors for measuring a second component of the magnetic field. Connecting lines which connect the Hall sensors which are arranged in the region of the edge of the same magnetic field concentrator run either parallel with respect to each other or form a single common line.

6 Claims, 4 Drawing Sheets

MAGNETIC ANGLE SENSOR

PRIORITY CLAIM

Applicant hereby claims foreign priority under 35 U.S.C §119 from Swiss Application No. 1108/10 filed Jul. 5, 2010, the disclosure of which is herein incorporated by reference.

FIELD OF THE INVENTION

The invention relates to a magnetic angle sensor.

BACKGROUND OF THE INVENTION

An arrangement for contactless detection of a rotational angle is known from U.S. Pat. No. 5,880,586. This arrangement comprises a permanent magnet as a rotary transducer which is rotatable around an axis and two Hall sensors as an angle sensor which detect two components of the magnetic field generated by the permanent magnet in a plane disposed perpendicularly to the rotational axis. A magnetic angle sensor which is especially suitable for this application is known from U.S. Pat. No. 6,545,462.

SUMMARY OF THE INVENTION

A magnetic angle sensor according to the invention comprises
  a semiconductor chip,
  at least two magnetic field concentrators of planar shape which are arranged on the surface of the semiconductor chip, the magnetic field concentrators arranged at a distance from each other, and
  four Hall sensors, each Hall sensor assigned to one of the magnetic field concentrators and comprising a Hall element or a cluster of Hall elements, the Hall elements integrated in the semiconductor chip and arranged in the region of the edge of the assigned magnetic field concentrator where they are permeated by field lines of the magnetic field which extend approximately perpendicularly to the said surface of the semiconductor chip in the region of the edge of the magnetic field concentrator, wherein two Hall sensors form a first pair of sensors for measuring a first component of the magnetic field and the other two Hall sensors form a second pair of sensors for measuring a second component of the magnetic field, and wherein connecting lines which connect the Hall sensors which are arranged in the region of the edge of the same magnetic field concentrator run either parallel with respect to each other or form a single common line.

The magnetic field concentrators are preferably circular.

Preferably, the first component of the magnetic field and said connecting lines include an angle of −45° and the second component of the magnetic field and said connecting lines include an angle of 45°.

BRIEF DESCRIPTION OF THE DRAWING FIGURES

The accompanying drawings, which are incorporated into and constitute a part of this specification, illustrate schematically one or more embodiments of the present invention and, together with the detailed description, serve to explain the principles and implementations of the invention. The figures are not to scale. In the drawings.

DETAILED DESCRIPTION OF THE INVENTION

Figure 1:
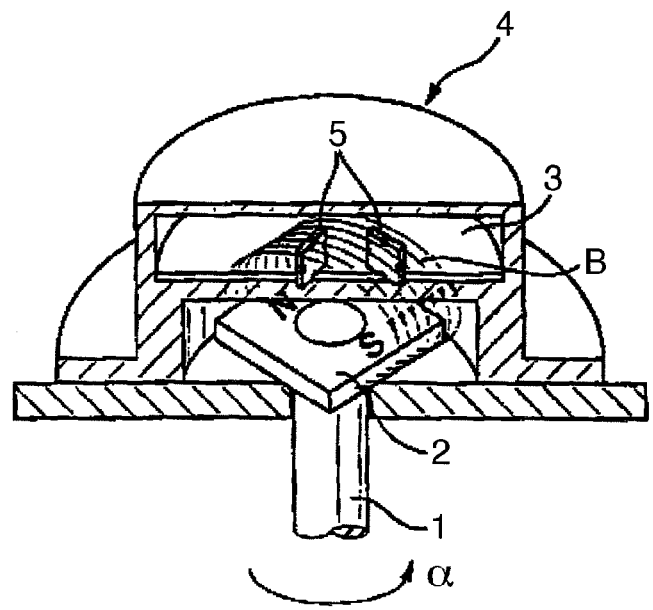
FIG. 1 shows a system for contactless detection of a rotational angle.

FIG. 1 shows a system for the contactless detection of a rotational angle $\alpha$, as is known from U.S. Pat. No. 5,880,586. The system comprises a permanent magnet 2 which is rotatable around a rotational axis 1 and an angle sensor 4 with two Hall sensors 5, which angle sensor is arranged in a plane 3 extending perpendicularly to the rotational axis 1. The two Hall sensors 5 are arranged with respect to the rotational axis 1 on the periphery of a circle and at a right angle with respect to each other, so that they detect two components of the magnetic field B which are rotated against one another by 90°, which will be referred to below as the X component and Y component.

Figure 2:
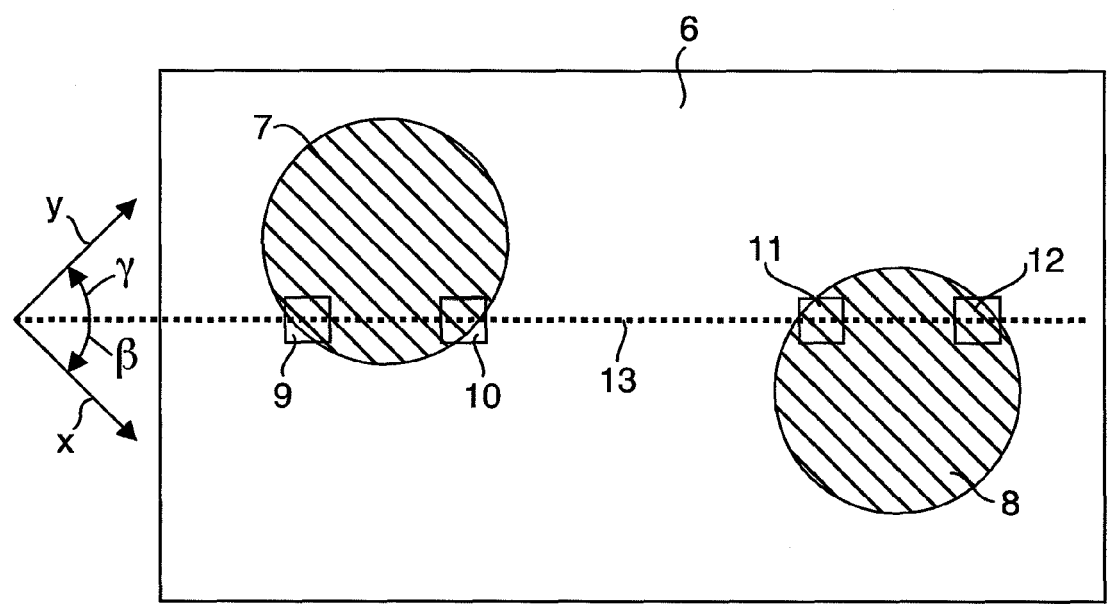
FIGS. 2-6 show different embodiments of angle sensors comprising Hall sensors and magnetic field concentrators.

FIG. 2 shows a top view of a first embodiment of an angle sensor 4 in accordance with the invention. The angle sensor 4 comprises a semiconductor chip 6 and two magnetic field concentrators 7 and 8 of planar shape which are arranged on the surface of the semiconductor chip 6. The two magnetic field concentrators 7 and 8 are arranged at a distance from one another and do not touch each other. The angle sensor 4 further comprises four Hall sensors 9 to 12. Every Hall sensor is a Hall element in this embodiment. The Hall elements are integrated in the semiconductor chip 6 and are arranged in the region of the respective edge the magnetic field concentrators 7 and 8, where they are permeated by the field lines of the magnetic field which extend in the region of the edge of the respective magnetic field concentrators 7 and 8 in an approximately perpendicular manner relative to the said surface of the semiconductor chip 6. The Hall elements are sensitive to that component of the magnetic field that runs perpendicular to the surface of the semiconductor chip 6. The semiconductor chip 6 also contains the electronic circuits required for the operation of the Hall elements and the electronic evaluation system which is required for the evaluation of the measured signals supplied by the Hall sensors, which electronic evaluation system can comprise analog and digital circuits.

The Hall sensors 9 and 11 form a first pair of sensors for measuring a first component of the magnetic field which is designated as the X component. The Hall sensors 10 and 12 form a second pair of sensors for measuring a second component of the magnetic field which is designated as the Y component. The Hall sensors which jointly form a pair of sensors are not arranged at the same magnetic field concentrator but at different magnetic field concentrators. Accordingly, the Hall sensor 9 is arranged at the edge of the first magnetic field concentrator 7 and the Hall sensor 11 at the edge of the second magnetic field concentrator 8. Similarly, the Hall sensor 10 is arranged at the edge of the first magnetic field concentrator 7 and the Hall sensor 12 at the edge of the second magnetic field concentrator 8. The connecting line which connects the Hall sensors 9 and 10 (or the centers of the Hall sensors 9 and 10) and the connecting line which connects the Hall sensors 11 and 12 (or the centers of the Hall sensors 11 and 12) form a single common line 13. The X component of the magnetic field (or the X axis) encloses an angle of $\beta=-45°$ with the line 13. The Y component of the magnetic field (or the Y axis) encloses an angle of $\gamma=+45°$ with the line 13. Therefore |β|=|γ| and |β|+|γ|=90°. The X component and the Y component of the magnetic field therefore include an angle of 90°.

Figure 3:
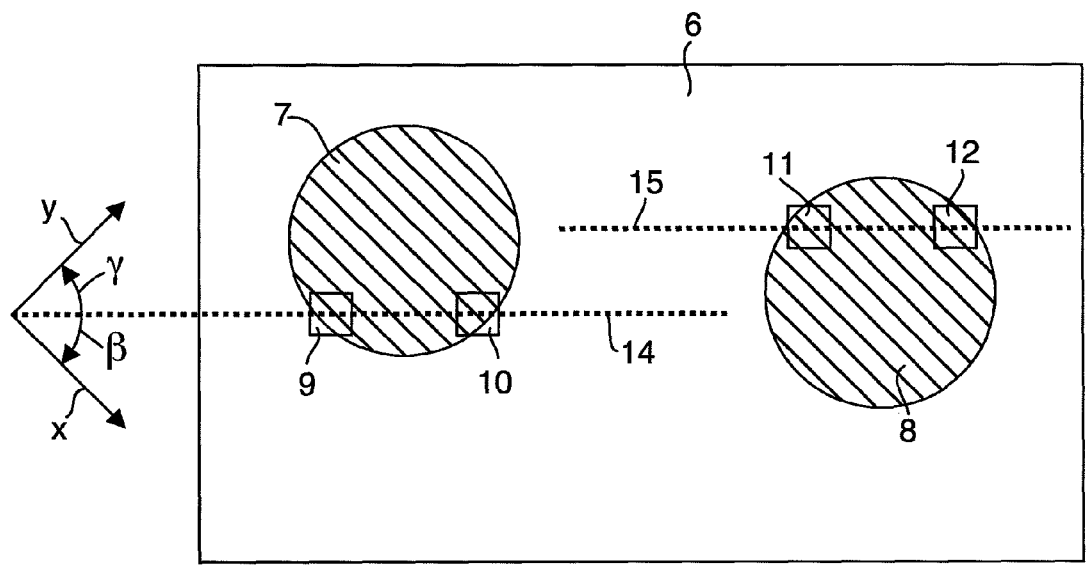

FIG. 3 shows a top view of a second embodiment of an angle sensor 4 in accordance with the invention. The configuration of this angle sensor 4 is very similar to the configuration of the angle sensor as described above, but the relative position of the magnetic field concentrators and the associated Hall sensors was changed. In this example the connecting line 14 which connects the Hall sensors 9 and 10 (or the centers of the Hall sensors 9 and 10) and the connecting line 15 which connects the Hall sensors 11 and 12 (or the centers of the Hall sensors 11 and 12) run parallel with respect to each other. The X component of the magnetic field (or the X axis) encloses an angle of β=−45° with the lines 14 and 15. The Y component of the magnetic field (or the Y axis) encloses an angle of γ=+45° with the lines 14 and 15. Therefore |β|=|γ| and |β|+|γ|=90°. The X component and the Y component of the magnetic field therefore include an angle of 90°.

Figure 4:
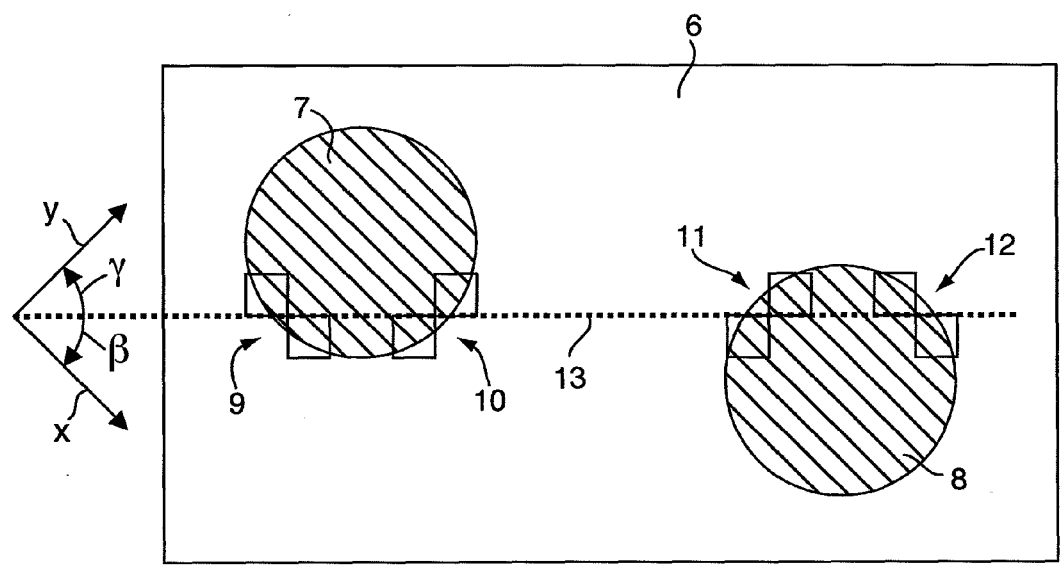

FIG. 4 shows a top view of a third embodiment of an angle sensor 4 in accordance with the invention which is arranged similarly to the angle sensor according to FIG. 2, but with the difference that the Hall sensors do not comprise a single Hall element but a cluster of Hall elements.

Figure 5:
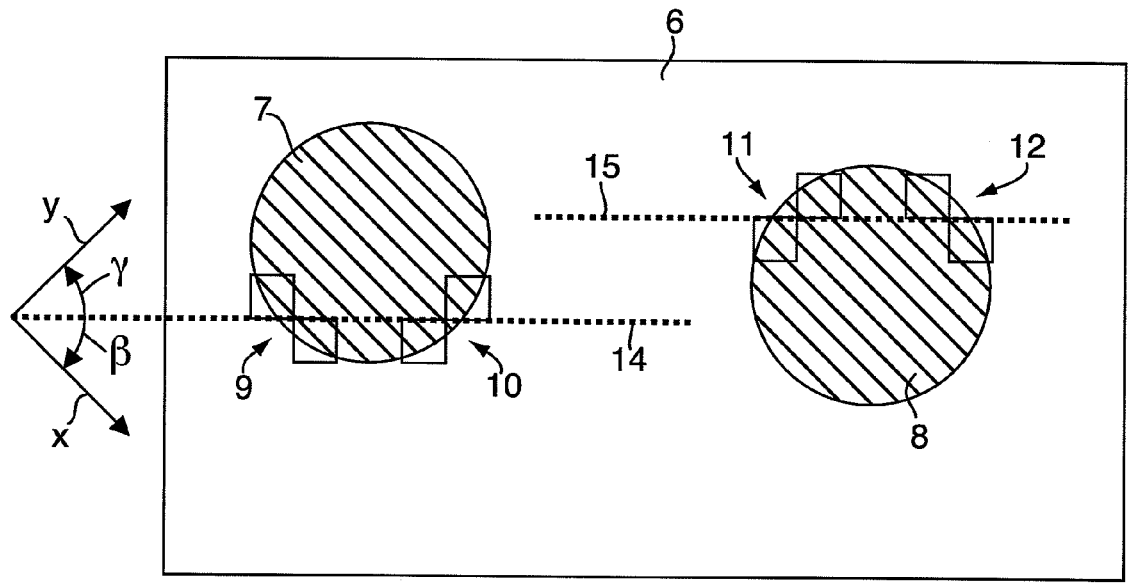

FIG. 5 shows a top view of a fourth embodiment of an angle sensor 4 in accordance with the invention which is arranged similarly to the angle sensor according to FIG. 3, but with the difference that the Hall sensors do not comprise a single Hall element but a cluster of Hall elements. In this embodiment, a cluster comprises two Hall elements which are represented in the drawings as squares which touch each other in one corner. A center can geometrically be assigned to each cluster of Hall elements. In these examples the center corresponds to the point at which the Hall elements of a cluster touch one another.

Figure 6:
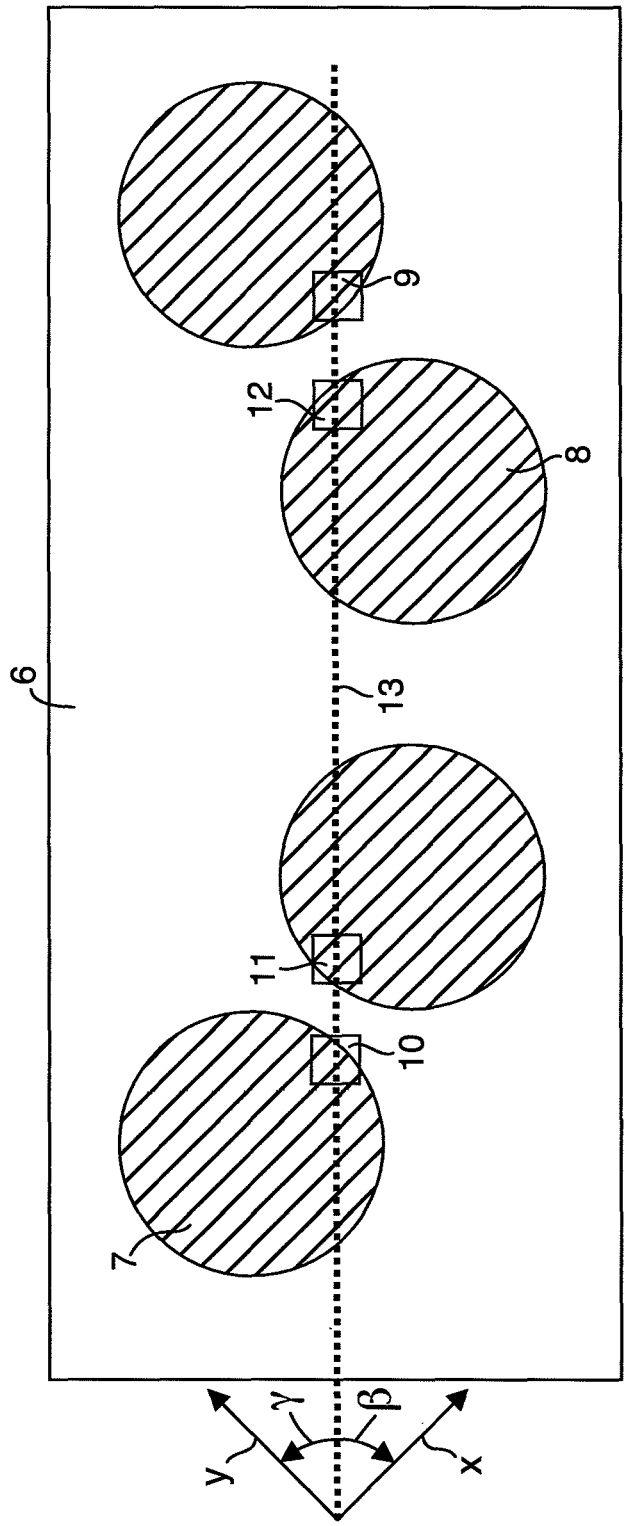

FIG. 6 shows a top view of a fifth embodiment of an angle sensor 4 in accordance with the invention. Four magnetic field concentrators are provided in this embodiment, with each magnetic field concentrator being associated with one Hall sensor. The distance between the magnetic field concentrators can have any size. The four Hall sensors 9 to 12 lie on one common line. It is also possible to displace the individual magnetic field concentrators including the associated Hall sensor parallel or perpendicularly to the line 13.

The magnetic field concentrators are preferably circular and thus also disk-like, as is shown.

Figure 7:
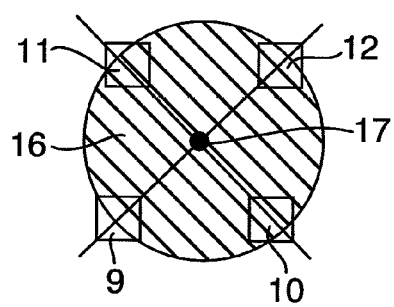
FIG. 7 illustrates how to determine the position of the individual Hall sensors with respect to the magnetic field concentrators.

FIG. 7 is used for illustrating how the position of the individual Hall sensors 9 to 12 is determined with respect to the magnetic field concentrators. When all magnetic field concentrators, which are illustrated here by a disk with the reference numeral 16, including the Hall sensors 9 to 12 arranged in the region of their edge, are placed at above one another, the illustration of FIG. 7 is obtained. The Hall sensors 9 to 12 are angularly offset by 90° with respect to each other concerning the center 17 of the circular magnetic field concentrators.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except by the spirit of the appended claims and their equivalents.

What is claimed is:

1. A magnetic angle sensor, comprising
a semiconductor chip,
at least two magnetic field concentrators of planar shape which are arranged on a surface of the semiconductor chip, the magnetic field concentrators arranged at a distance from each other, and
four Hall sensors, each Hall sensor assigned to one of the magnetic field concentrators and comprising a Hall element or a cluster of Hall elements, the Hall elements integrated in the semiconductor chip and arranged in the region of the edge of the assigned magnetic field concentrator where they are permeated by field lines of a magnetic field which extend approximately perpendicularly to the said surface of the semiconductor chip in the region of the edge of the magnetic field concentrator, wherein two of the Hall sensors form a first pair of sensors for measuring a first component of the magnetic field and the other two of the Hall sensors form a second pair of sensors for measuring a second component of the magnetic field, wherein the two Hall sensors of the first pair are assigned to different magnetic field concentrators, the two Hall sensors of the second pair are assigned to different magnetic field concentrators, and wherein a connecting line which connects one Hall sensor of the first pair with one Hall sensor of the second pair runs either parallel to or forms a single common line with a line which connects the other Hall sensor of the first pair with the other Hall sensor of the second pair.

2. The magnetic angle sensor according to claim 1, wherein the magnetic field concentrators are circular.

3. The magnetic angle sensor according to claim 1, wherein the first component of the magnetic field and said connecting lines include an angle of −45° and the second component of the magnetic field and said connecting lines include an angle of 45°.

4. The magnetic angle sensor according to claim 2, wherein the first component of the magnetic field and said connecting lines include an angle of −45° and the second component of the magnetic field and said connecting lines include an angle of 45°.

5. The magnetic angle sensor according to claim 1 wherein each of the four Hall sensors is assigned to different magnetic field concentrators, and the line connecting the one Hall sensor of the first pair with the one Hall sensor of the second pair is a continuous line connecting the other Hall sensor of the first pair with the other Hall sensor of the second pair.

6. The magnetic angle sensor according to claim 2 wherein the four Hall sensors are positioned relative to the edges of the circular magnetic field concentrators arranged on the surface of the semiconductor chip such that if the circular magnetic field concentrators were superimposed on one another, the four Hall sensors would be positioned 90 degrees from one another.

* * * * *